(12) United States Patent
Tsuchiya et al.

(10) Patent No.: US 11,697,085 B2
(45) Date of Patent: Jul. 11, 2023

(54) DUST FILTER

(71) Applicant: AISAN KOGYO KABUSHIKI KAISHA, Obu (JP)

(72) Inventors: Takumi Tsuchiya, Ichinomiya (JP); Norihiro Kondo, Toyota (JP); Tsuneyuki Kurata, Okazaki (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 222 days.

(21) Appl. No.: 17/353,494

(22) Filed: Jun. 21, 2021

(65) Prior Publication Data

US 2022/0001319 A1   Jan. 6, 2022

(30) Foreign Application Priority Data

Jul. 3, 2020   (JP) ................................. 2020-115447

(51) Int. Cl.
  *B01D 45/08*   (2006.01)
  *B01D 46/00*   (2022.01)
  (Continued)

(52) U.S. Cl.
  CPC ..... *B01D 46/0031* (2013.01); *B01D 39/1676* (2013.01); *B01D 45/08* (2013.01); *B01D 46/0005* (2013.01); *B01D 46/521* (2013.01); *B01D 50/20* (2022.01); *B01D 53/04* (2013.01); *B01D 2253/102* (2013.01); *B01D 2257/702* (2013.01); *B01D 2259/4516* (2013.01); *B01D 2259/4566* (2013.01); *B01D 2273/28* (2013.01); *F02M 25/0854* (2013.01)

(58) Field of Classification Search
  CPC ............ B01D 46/0005; B01D 46/0031; B01D 46/24; B60H 1/3233; F02M 25/0854
  USPC .......................................................... 55/462
  See application file for complete search history.

(56) References Cited

U.S. PATENT DOCUMENTS 4,924,548 A * 5/1990 Touya ................... A47L 7/0019
                                                      55/467
5,858,034 A * 1/1999 Shida ................. B01D 46/0089
                                                      55/420
(Continued)

FOREIGN PATENT DOCUMENTS

JP    2009156032 A    7/2009
JP    2010130965 A    6/2010
(Continued)

*Primary Examiner* — Long T Tran
*Assistant Examiner* — James J Kim
(74) *Attorney, Agent, or Firm* — Conley Rose, P.C.

(57) ABSTRACT

A dust filter is configured to filter air drawn into a vehicle canister. The dust filter includes a first portion including a first engaging portion and a second portion including a second engaging portion. The second portion is attached to the first portion by engagement of the second engaging portion with the first engaging portion. The first portion includes a filtration member and a case. The case includes an inner chamber within which the filtration member is disposed. The case includes a drainage port configured to drain liquid that has infiltrated the inner chamber. The second portion is attached to the first portion to form a cover that covers the drainage port together with the first portion. The cover has an outlet that opens to the outside at a position lower than the drainage port.

15 Claims, 14 Drawing Sheets

(51) Int. Cl.
  *B01D 46/52*  (2006.01)
  *B01D 39/16*  (2006.01)
  *B01D 50/20*  (2022.01)
  *F02M 25/08*  (2006.01)
  *B01D 53/04*  (2006.01)

(56) References Cited

U.S. PATENT DOCUMENTS

| 7,849,838 B2 | 12/2010 | Ohhira et al. |
| 2020/0347809 A1 * | 11/2020 | Bhat .................. F02M 37/04 |

FOREIGN PATENT DOCUMENTS

| JP | 2011256760 A | 12/2011 |
| JP | 2015071354 A | 4/2015 |

\* cited by examiner

DUST FILTER

CROSS-REFERENCE TO RELATED APPLICATIONS

This application claims priority to Japanese patent application serial number 2020-115447, filed Jul. 3, 2020, which is hereby incorporated herein by reference in its entirety for all purposes.

BACKGROUND

The present disclosure relates generally to dust filters. More specifically, the present disclosure relates to dust filters that filter air drawn into canisters mounted to vehicles.

Vehicles equipped with an engine, such as automobiles, are provided with a canister that captures evaporated fuel generated in a fuel tank. The canister communicates with the atmosphere via an atmospheric passage. The atmospheric passage is provided with a dust filter that filters air drawn into the canister during purging. In some dust filters, a case accommodating a filtration member disposed therein includes an atmospheric port for the intake of air. In addition, the case often includes a drainage port for draining water from the bottom thereof. Further, a gutter-shaped drainage guide, which projects diagonally downward from the case, is provided at a drainage groove. Thus, for example, even if water enters into the case of the dust filter via the atmospheric port during rain or a car wash, the water is guided to the outside along the drainage guide to the drainage port at the bottom. Accordingly, the water does not accumulate in the case.

SUMMARY

One embodiment of the present disclosure is a dust filter that filters air drawn into a vehicle canister. The dust filter may include a first portion and a second portion formed separately from the first portion. The first portion may include a first engaging portion. The second portion may include a second engaging portion. The second portion may be attached to the first portion by engaging the second engaging portion of the second portion with the first engaging portion of the first portion. The first portion may include a filtration member and a case. The case may include an inner chamber for accommodating the filtration member. The case may include a drainage port for draining liquid that has infiltrated the inner chamber. The second portion may be attached to the first portion to form a cover. The cover covers the drainage port. The cover may have an outlet that opens to the outside. The outlet may be located lower than the drainage port relative to a direction of gravity. Accordingly, the infiltration of water via the drainage port can be suppressed, while also ensuring adequate drainage performance of the dust filter. Further, since at least a part of the cover is separated, the cover may be configured only in the required vehicle.

According to another embodiment of the present disclosure, the first portion may include a cover upper member having the first engaging portion integrally formed therewith. The cover upper member may be integrally molded with at least a part of the case. The cover upper member may surround the drainage port. The second portion may be configured as a cover lower member having the second engaging portion integrally formed therewith. The cover may be formed by attaching the cover lower member to the cover upper member. As a result, it is possible to prevent water from entering the inside of the cover through the upper side of the cover. In addition, the structure of the cover, including a drainage channel therein, may be designed more freely.

According to another embodiment of the present disclosure, the cover upper member and the cover lower member may each include a wall. The cover lower member may be fitted inside the cover upper member so that their walls overlap each other. The wall of the cover upper member may extend to the vicinity of the lower end of the wall of the cover lower member. Accordingly, water that has entered the gap between the overlapping walls from below may be restricted from infiltrating the inside of the cover.

According to another embodiment of the present disclosure, the wall of the cover lower member may include a linear protrusion that projects toward the wall of the cover upper member. Accordingly, water that has entered the gap between the overlapping walls from below may be restricted from infiltrating the inside of the cover.

According to another embodiment of the present disclosure, the first engaging portion may have a locking hole, and the second engaging portion may have a pawl that may engage the locking hole. When the second portion is attached to the first portion, the linear protrusion may be disposed above the locking hole. Accordingly, when water has entered through the locking hole of the engaging portion, it is possible to prevent water from infiltrating the inside of the cover.

According to another embodiment of the present disclosure, a flange may be formed on the wall of the cover upper member. The flange may cover an extended area of the gap between the overlapping walls. Accordingly, it is possible to prevent vigorously flowing water from directly infiltrating the gap between the overlapping walls.

According to another embodiment of the present disclosure, the flange may include an upper surface that slopes downward toward the edge thereof. Accordingly, water flowing along the outer surface of the wall may be prompted to fall from the cover.

According to another embodiment of the present disclosure, the cover upper member may include a baffle plate or a projecting portion that extends downward between the drainage port and the wall of the cover upper member, or that extends between the drainage port and the outlet. Accordingly, it is possible to prevent water that has entered the cover from flowing through the ceiling of the cover upper member and reaching the periphery of the drainage port.

According to another embodiment of the present disclosure, the second portion may include a cover first member and a cover second member. The cover first member may include the second engaging portion integrally formed therewith. The second cover member may be attached to the first cover member by a snap-fit mechanism. The cover may be formed by attaching the cover second member to the cover first member. Accordingly, a structure in the cover, such as the drainage channel, may be designed more freely. In addition, when the cover is unnecessary, the cover may be completely removed. Thus, the case may be used regardless of the presence or absence of the cover.

According to another embodiment of the present disclosure, one of the first engaging portion and the second engaging portion may include a pair of grooves. The grooves may extend in parallel to each other and open in opposite directions. The other of the first engaging portion and the second engaging portion may include a pair of projecting pieces corresponding to the grooves. The cover may be attached to the case by moving the projecting pieces along the grooves in a state where the projecting pieces are fitted into the grooves. Accordingly, the cover may be attached more easily.

According to another embodiment of the present disclosure, each groove may have a protrusion at the bottom. When the cover is attached to the case, the protruding pieces may press the protrusions. Accordingly, it is possible to prevent the cover from rattling in the depth direction of the groove when it is in the attached state.

According to another embodiment of the present disclosure, each groove may have a notch on the side wall. Each projecting piece may be divided into a front portion and a rear portion. The front portion of each protruding piece may be inserted into the corresponding groove through the notch. Therefore, the distance over which the projecting pieces need to slide when attaching the cover may be reduced. Accordingly, the cover may be attached without interference by peripheral members, such as an inlet pipe.

According to another embodiment of the present disclosure, one of the first engaging portion and the second engaging portion may be elastically deformable. The other of first engaging portion and the second engaging portion may be engaged by the elastic deformation. Accordingly, it is possible to prevent the cover from rattling when it is in the attached state.

According to another embodiment of the present disclosure, the second portion may be attached by relative movement to the first portion. A guide mechanism for guiding the relative movement may be provided between the first portion and the second portion. Thereby the cover may be attached more easily.

According to another embodiment of the present disclosure, the drainage port may be at least one opening formed at the bottom of the inner chamber. The cover may have at least one baffle plate disposed therein. A drainage channel, which does not allow any of the openings and the outlet to directly communicate in a linear fashion, may be defined, at least in part, by the at least one baffle plate. Accordingly, it is possible to more reliably suppress the infiltration of water via the drainage port.

BRIEF DESCRIPTION OF THE DRAWINGS

In FIG. 4, a flow path of air drawn into the dust filter is indicated by arrows.

In FIG. 5, the drainage channel formed by baffle plates inside the cover is indicated by arrows.

In FIG. 9, the insertion direction of the projecting piece of the cover is shown with arrows.

DETAILED DESCRIPTION

In the dust filter described in Japanese Patent Application Laid-Open No. 2011-256760, there is a possibility that water splashed when the vehicle travels through a puddle may infiltrate the case of the dust filter through the drainage guide. Further, the same thing may occur when washing the lower part of the vehicle body with a pressure washer. If the water level inside the case rises due to a large amount of water flowing into the case through the drainage guide, the filtration member disposed in the case may be infiltrated by the water and its function may be undesirably impaired. Therefore, it is desired to suppress the infiltration of water into the case via the drainage port, while still ensuring adequate drainage performance of the drainage port.

Figure 1:
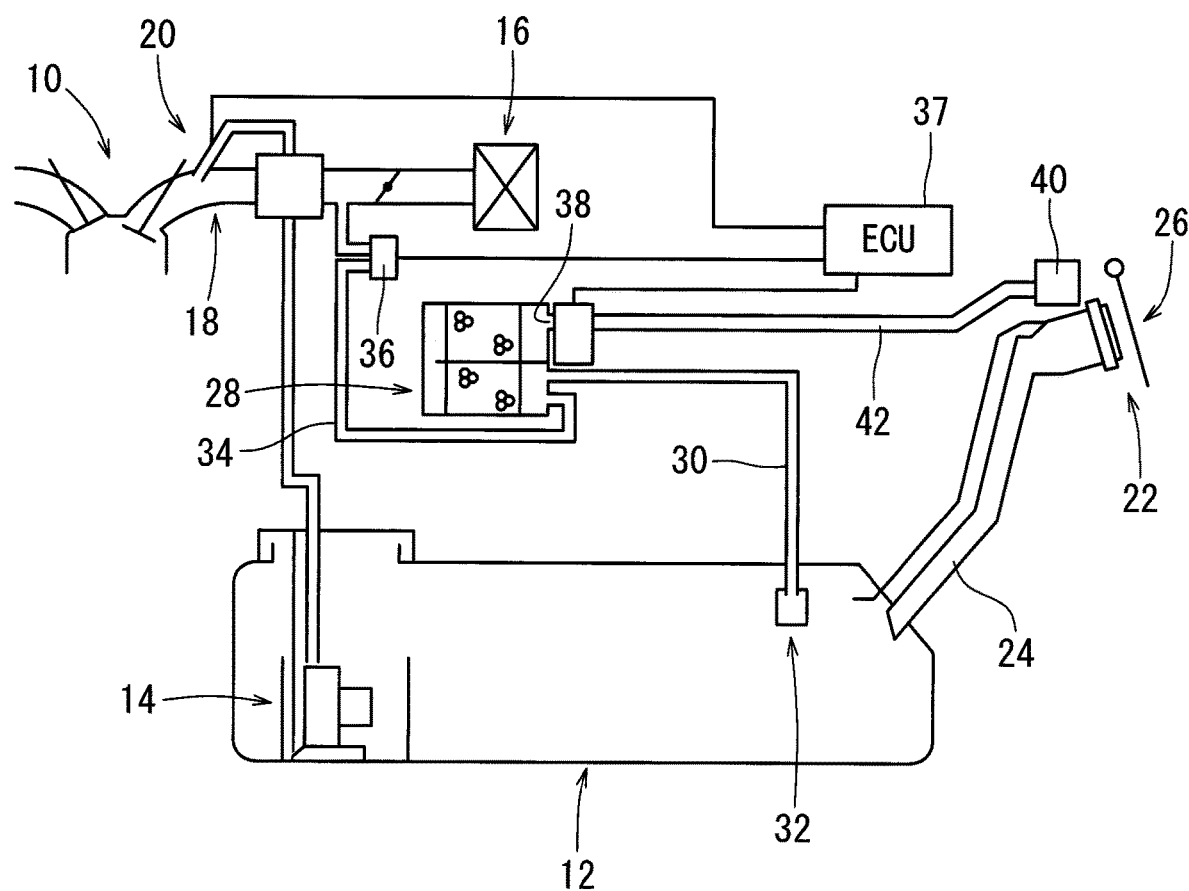
FIG. 1 is a schematic view of an embodiment of a fuel system of an automobile in accordance with the principles described herein.

Hereinafter, various embodiments of the present disclosure will be described with reference to the drawings. Referring now to FIG. 1, a fuel system for a vehicle such as automobile is shown. The fuel system includes an engine 10 and a fuel tank 12 for storing the fuel burned by the engine 10. The engine 10 intakes air cleaned by an air cleaner 16 mounted to an intake pipe 18. A pump module 14 is disposed within the fuel tank 12. Fuel delivered by the pump module 14 is injected from an injector 20 into the intake pipe 18. An inlet pipe 24, which guides fuel supplied from a fuel filler port 22 into the fuel tank 12, is connected to the fuel tank 12. The fuel filler port 22 can be selectively closed by a cap 26. The inlet pipe 24 extends obliquely upward from the fuel tank 12 to the fuel filler port 22.

As shown in FIG. 1, the fuel system includes a canister 28 configured to capture evaporated fuel generated in the fuel tank 12 and prevent it from being released into the atmosphere. An adsorption layer, which is made of, for example, activated carbon, is provided in the canister 28. The canister 28 is in fluid communication with the fuel tank 12 via a tank-side passage 30. The adsorption layer in the canister 28 adsorbs the evaporated fuel flowing from the tank side passage 30. An Onboard Refueling Vapor Recovery valve (ORVR valve) 32, which is made of, for example, a float valve, may be provided in the fuel tank 12. The evaporated fuel that has passed through the ORVR valve 32 is sent to the canister 28.

The canister 28 is in selective fluid communication with the intake pipe 18 of the engine 10 via a purge passage 34.

A purge control valve 36 is provided along the purge passage 34. The purge control valve 36 is controlled to open and close according to the operating state of the engine 10, for example by an electronic control unit (ECU) 37. When the purge control valve 36 is open, the intake negative pressure of the engine 10 may act on the canister 28 via the purge passage 34. Therefore, the evaporated fuel adsorbed on the adsorption layer in the canister 28 can be desorbed. Then, the evaporated fuel may be introduced into the engine 10, together with the intake air flowing through the intake pipe 18. As a result, the evaporated fuel may be burned by the engine 10.

The canister 28 may have an atmospheric port 38 which communicates with the atmosphere. During the purging operation of the canister 28, air (purge air) may be introduced into the canister 28 from the atmosphere, via the atmospheric port 38. In addition to the purging operation, negative pressure may be applied to the fuel tank 12 due to, for example, fuel consumption or a temperature drop. On the contrary, positive pressure may be applied to the fuel tank 12 when evaporated fuel is generated due to a temperature rise, fuel fluctuation, or the like. The pressure fluctuation in the fuel tank 12 may be mitigated by introducing air into the canister 28 via the atmospheric port 38 and by releasing air from the canister 28 into the atmosphere via the atmospheric port 38.

Figure 2:
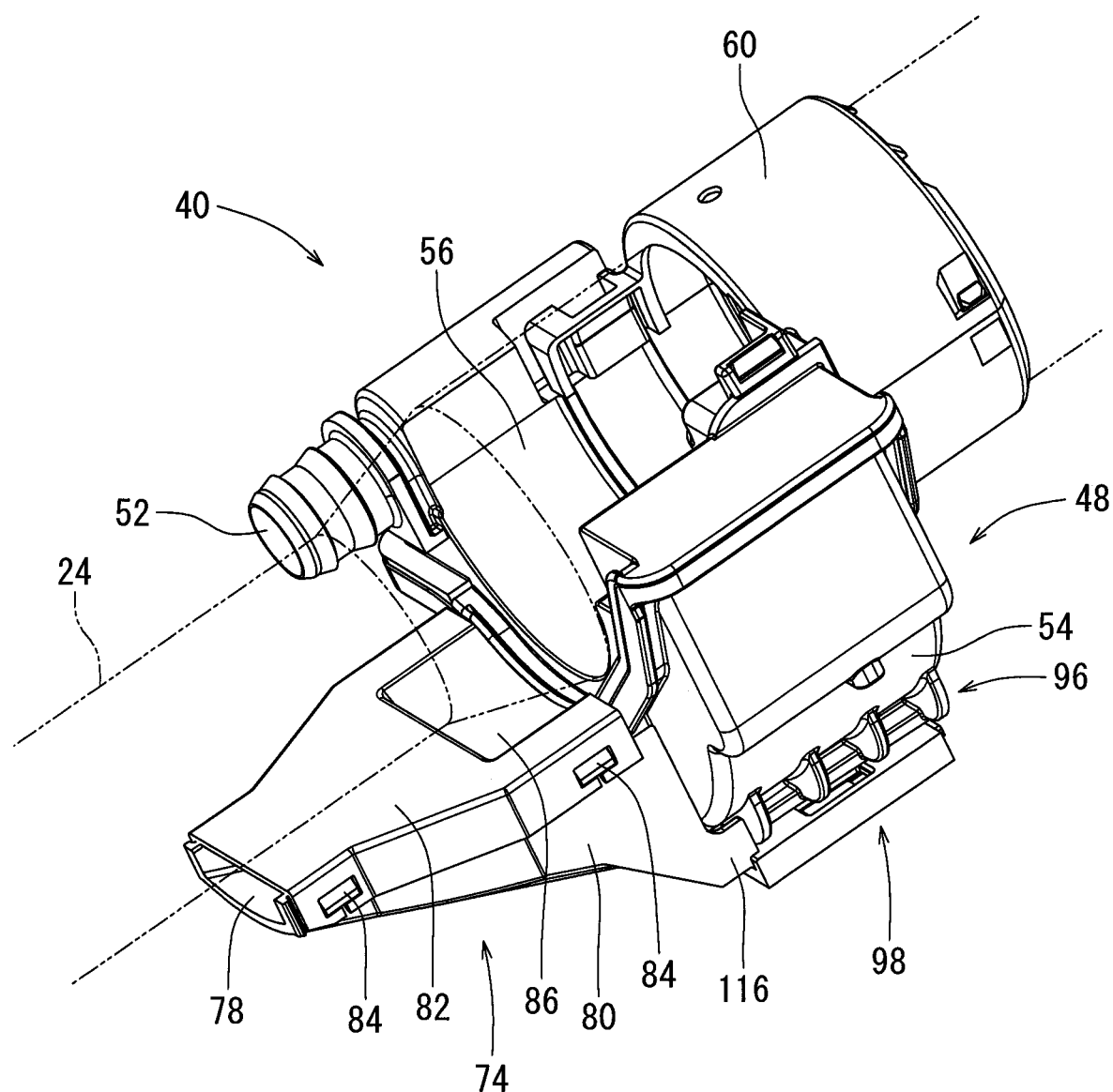
FIG. 2 is a perspective view of a dust filter of the dust filter of FIG. 1 attached to the inlet pipe of FIG. 1 (the outer profile of the inlet pipe is illustrated with a two-dot-chain line).
Figure 3:
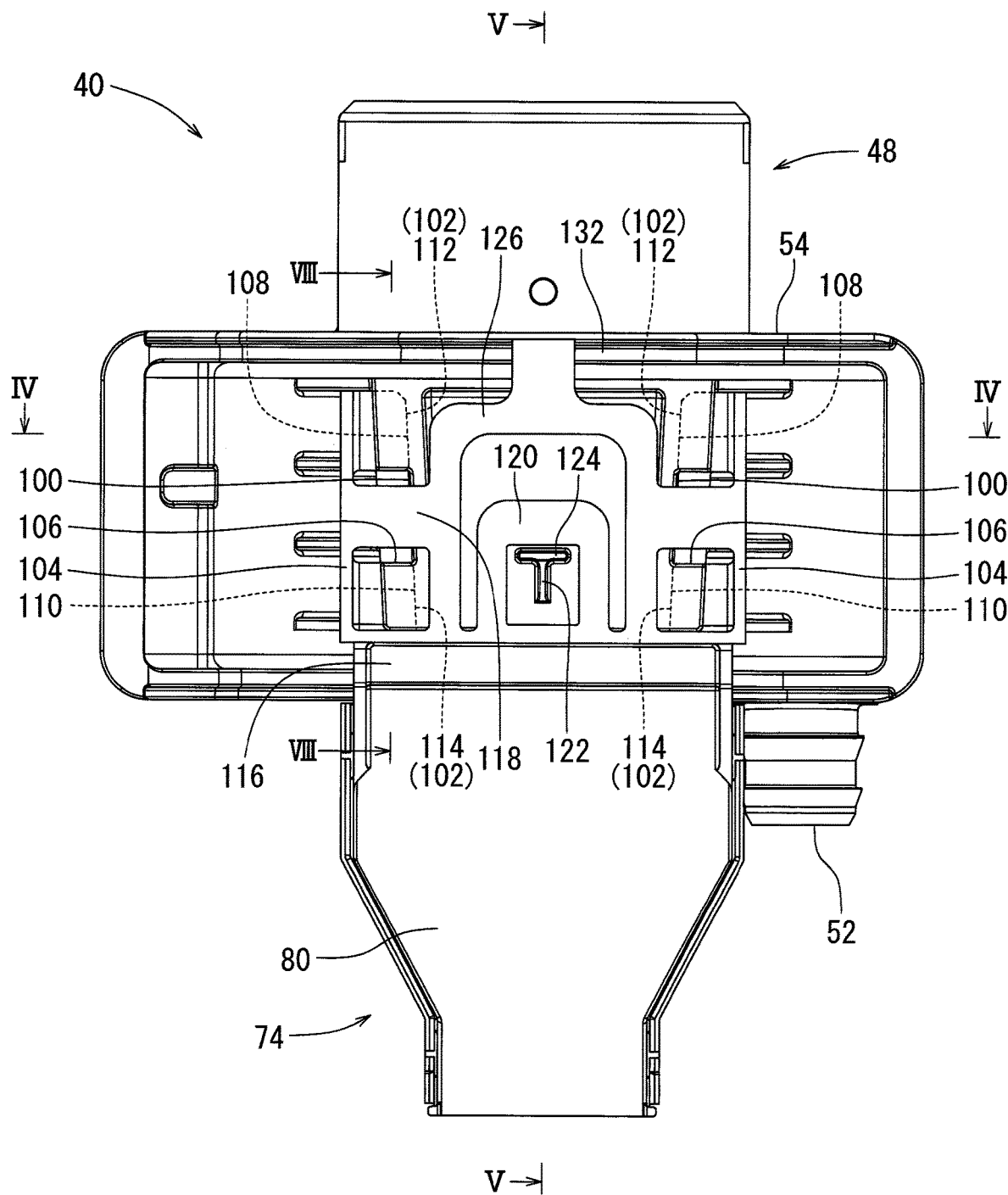
FIG. 3 is a bottom view of the engaging portion between the case and the cover of FIG. 1.
Figure 4:
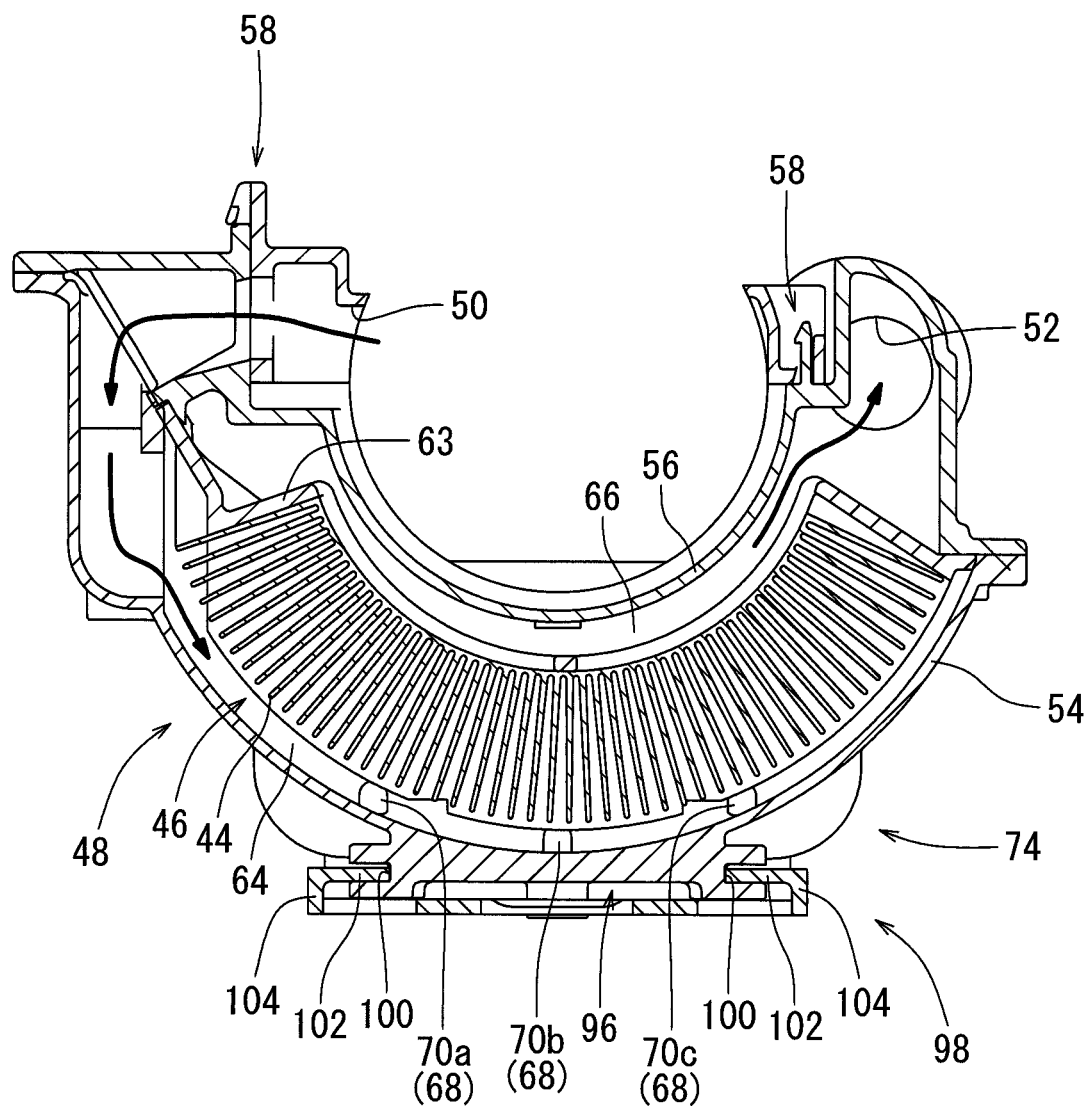
FIG. 4 is a cross-sectional view of the dust filter of FIG. 3 taken along the line IV-IV of FIG. 3.

As shown in FIGS. 2 to 4, the fuel system is provided with a dust filter 40 (air filter) for removing foreign matter, such as dust, from the air drawn into the canister 28. The dust filter 40 is in fluid communication with the canister 28 via a connecting passage 42. The connecting passage 42 may comprise, for example, pipes and hoses (see FIG. 1). The dust filter 40 includes a filtration member 44 and a case 48. The case 48 includes an inner chamber 46 for accommodating the filtration member 44. The case 48 may be made of, for example, resin. The air, which is drawn through the connecting passage 42 when a purging operation is being performed on the canister 28, is filtered by the dust filter 40. Such filtration removes foreign matter, such as dust. The case 48 includes an atmospheric port 50 and a canister-side port 52. The atmospheric port 50 is open to the atmosphere for the intake of air. The canister-side port 52 is connected to the canister 28.

The dust filter 40 may be disposed, for example, near the fuel filler port 22 of the inlet pipe 24. In this embodiment, the case 48 is formed in a substantially semi-cylindrical shape such that it can be mounted to the outside of the inlet pipe 24. When the dust filter 40 is mounted on the inclined portion of the inlet pipe 24, the dust filter 40 may be also be oriented in an inclined posture. The case 48 includes a lower member 54 and an upper member 56 coupled to the lower member 54. The lower member 54 may be attached to the upper case with an appropriate assembly mechanism, such as a snap-fit mechanism 58.

The dust filter 40 may be attached to the inlet pipe 24 with an appropriate holding member 60 having, for example, a semi-cylindrical shape. In particular, the dust filter 40 may be attached by holding the inlet pipe 24 between the holding member 60 and the case 48. The holding member 60 may be attached to the case 48 with an appropriate assembly mechanism, such as a snap-fit mechanism 62. The atmospheric port 50 may be disposed, for example, on the inner peripheral side of the case 48. An appropriate gap may be provided between the atmospheric port and the surface of the inlet pipe 24 to allow the flow of air therebetween.

The filtration member 44 may be, for example, a filter paper folded in a ribbed state. The filtration member 44 is disposed in the inner chamber 46 and held in position with a holding member 63. In another embodiment, the filtration member 44 may be a block made of a urethane foam resin. When the filtration member 44 is properly disposed in in the case 48, the filtration member 44 divides the inner chamber 46 into an atmospheric-side space 64, which is on the lower side, and a canister-side space 66, which is on the upper side.

When the connecting passage 42 is subjected to a negative pressure, air may flow from the atmosphere into the case 48, via the atmospheric port 50. Inside the case 48, the air may flow from the atmospheric-side space 64 to the canister-side space 66, passing through the filtration member 44. At this time, dust may be captured by the filtration member 44. The purified air may be introduced into the canister 28, from the canister-side space 66 via the connecting passage 42.

Figure 5:
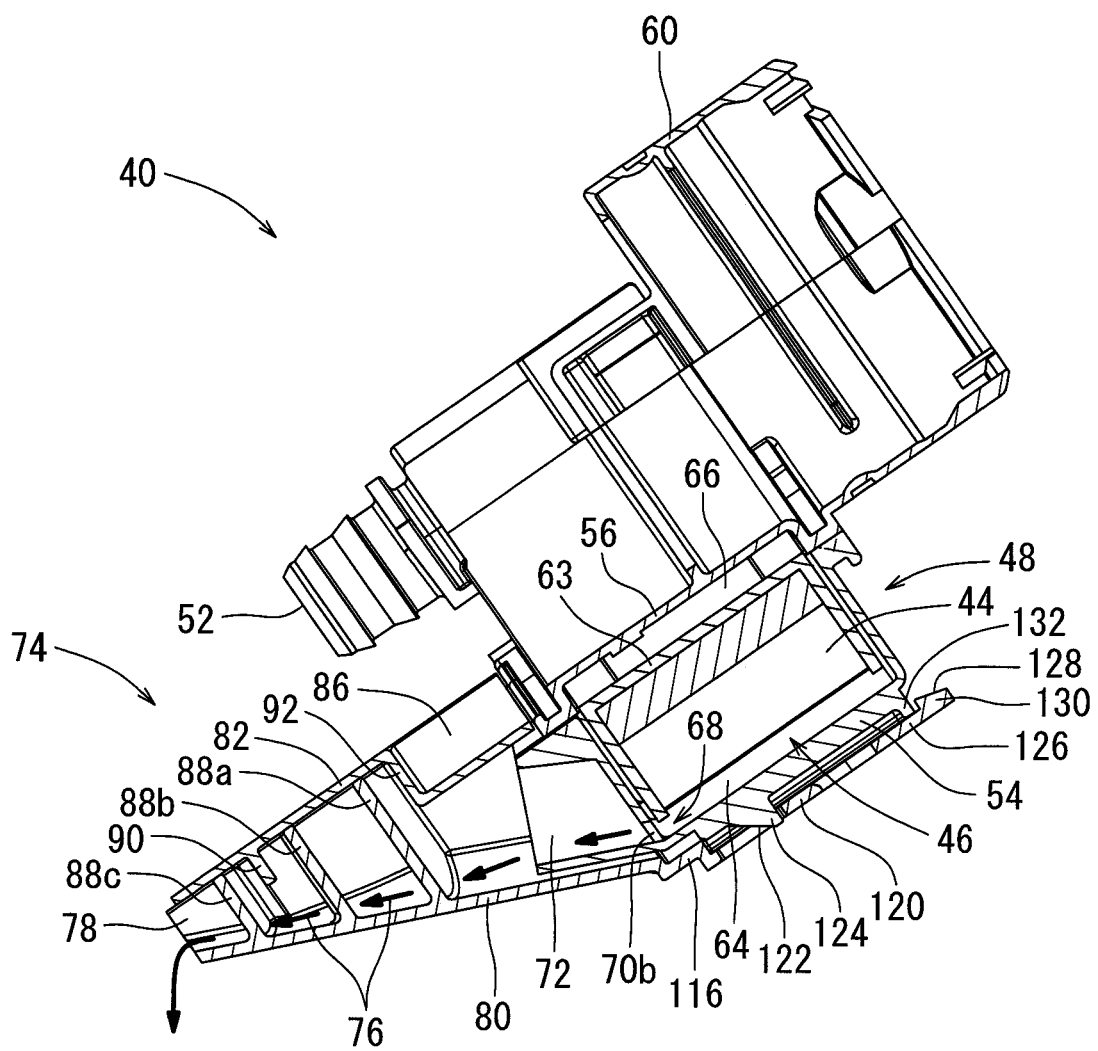
FIG. 5 is a cross-sectional view of the dust filter of FIG. 3 taken along the line V-V of FIG. 3.
Figure 6:
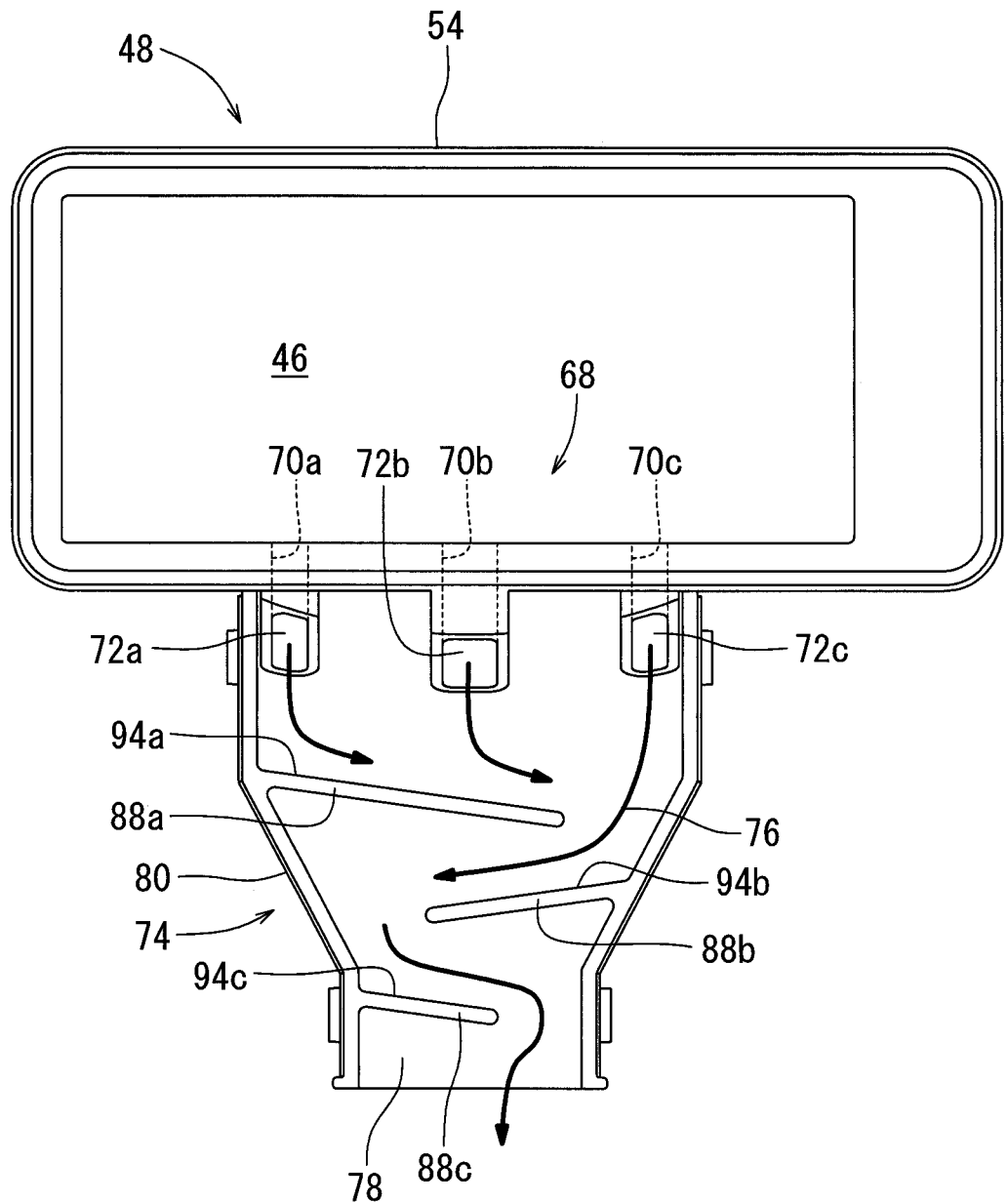
FIG. 6 is a top view of the lower member of FIG. 2 with the upper member of the cover removed.

As shown in FIGS. 4 to 6, a drainage port 68 is provided at the bottom of the case 48. The drainage port 68 is positioned and configured to discharge a liquid, such as water, that has infiltrated the case 48. The drainage port 68 is positioned on the atmospheric side of the case 48 with respect to the filtration member 44. For instance, the drainage port 68 is at a position so that it is in direct fluid communication with the atmospheric-side space 64 of the inner chamber 46 within the case 48. In a state where the dust filter 40 is fixed to the inlet pipe 24, the drainage port 68 may be located at or near the lowest portion of the atmospheric-side space 64 inside the case 48 relative to the direction of gravity. When it rains or when the car is washed, water, together with air, may infiltrate the case 48 via the atmospheric port 50. However, the water that infiltrates the case 48 may be discharged to the outside of the case 48 via the drainage port 68. This is facilitated by the drainage port 86 being located at the bottom of the atmospheric-side space 64. Therefore, it is possible to prevent water from accumulating at the bottom of the inner chamber 46 of the case 48. This may also help prevent deterioration of the filtration performance of the dust filter 40. The drainage port 68 may be, for example, at least one opening 70a to 70c that is opened at the bottom surface of the case 48.

A guide passage 72 extends diagonally downward from the opening 70a to 70c and the case 48. The guide passage 72 comprises a structure capable of being easily closed for an air leakage inspection of the case 48 of the dust filter 40. For example, the guide passage 72 may have such a structure that corresponds to cutting off a tip in a flat surface.

As shown in FIGS. 2, 5, and 6, the dust filter 40 includes a cover 74 configured to cover the drainage port 68, so as to prevent water from entering the case 48. In this embodiment, the cover 74 is a hollow member having a drainage channel 76 formed therein. The cover 74 has an outlet 78 configured to open to the outside. The outlet 78 is positioned lower than the drainage port 68 relative to the direction of gravity. Water that has infiltrated the case 48 is discharged from the drainage port 68 into the cover 74. Then, the water may travel through the drainage channel 76 and fall to the outside through the outlet 78. The drainage channel 76 is shaped to define a tortuous path so that the opening 70a to 70c (or each opening if there is a plurality of openings), which forms the drainage port 68 of the case 48, and the outlet 78 are not in direct linear fluid communication with each other. As a result, the length of the drainage channel 76 may become longer than a straight-line distance from the opening 70a to 70c to the outlet 78. Such a shape of the drainage channel 76 may be, for example, a labyrinth shape. Due to the shape of the drainage channel 76, for example, even if a jet of water or a cleaning liquid enters the drainage channel 76 via the outlet 78 when the vehicle is washed with a pressure washer, the influence of the jet of water may be weakened by the drainage channel 76. This weakening may prevent the jet of water from reaching the drainage port 68. The drainage channel 76 may have a branch and/or a convergence.

As shown in FIGS. 2, 5, 6, and 7, the cover 74 includes a lower member 80 and an upper member (lid member) 82. The upper member 82 of the cover 74 is attached to the lower member 80 by an appropriate mechanism, such as a snap-fit mechanism 84. By forming the cover 74 in a two-member structure in this way, the desired drainage channel 76, one embodiment of which was described above, may be more easily formed. If necessary, the upper member 82 may be provided with a recessed portion 86 configured to prevent interference between the cover 74 and surrounding member(s) (for example, a tapered portion of the inlet pipe 24).

As shown in FIGS. 5 and 6, the cover 74 is internally provided with one or more baffle plate(s). The one or more baffle plate(s) are configured to interrupt a straight line connecting the opening 70*a* to 70*c* and the outlet 78. In this embodiment, three baffle plates 88*a*, 88*b*, 88*c* are formed on the lower member 80 of the cover 74. The baffle plates 88*a*, 88*b*, 88*c* may aid in forming the drainage channel 76. The drainage channel 76 does not allow the opening 70*a* to 70*c* and the outlet 78 to directly communicate linearly, in part due to the positions and orientations of the baffle plates 88*a*, 88*b*, 88*c*. More specifically, the drainage channel 76 in the cover 74 has a labyrinth shape defined, at least in part, by the baffle plates 88*a*, 88*b*, 88*c*. Although not shown, in another embodiment, only one baffle plate may be provided.

Figure 7:
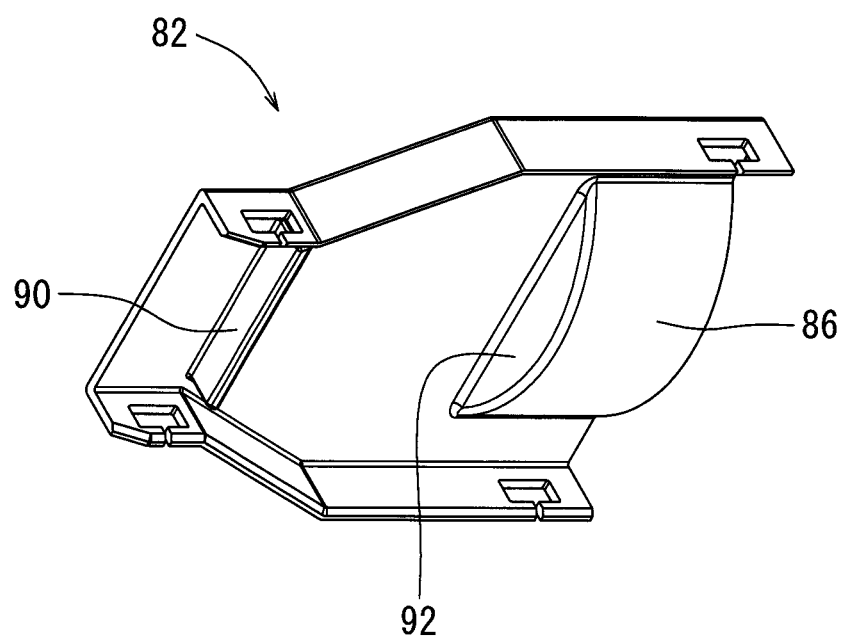
FIG. 7 is a perspective view of the upper member of FIG. 2.
Figure 8:
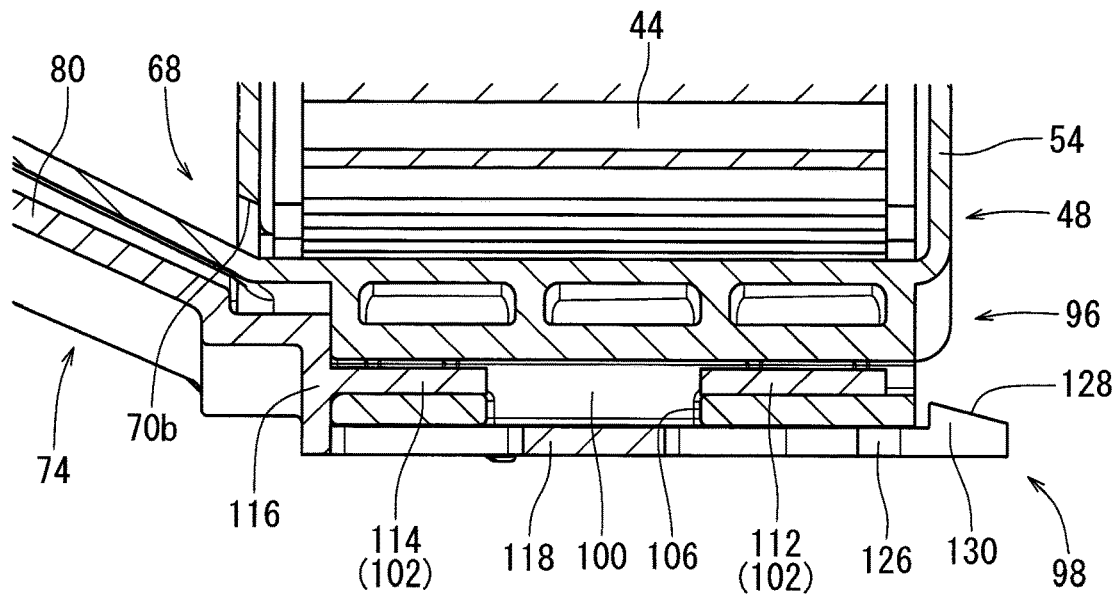
FIG. 8 is an enlarged cross-sectional view of the engaging portion between the case and the cover of FIG. 3 taken along the line VIII-VIII of FIG. 3.

As shown in FIGS. 5 and 7, a baffle plate 90 is provided on the upper member 82. The baffle plate 90 of the upper member 82 overlaps with the baffle plate 88*c* of the lower member 80 when the upper member 82*a* is attached to the lower member 80. Even if there is a clearance (not shown), which may aid in assembly, between the baffle plate 88*c* of the lower member 80 and the baffle plate 90 of the upper member 82, it is possible to suppress the influence of the water flow toward the drainage port 68, the water having entered via the outlet 78. For instance, if the water flow exceeds the upper side of the baffle plate 88*c* on the lower member 80, the presence of a baffle plate 92 of the upper member 82 may suppress the influence of the water flow. The baffle plate 92 may be disposed on the upper member 82 at a position closer to the drainage port 68 than the baffle plate 88*c* which is closest to the outlet 78. Further, the wall of the recessed portion 86 of the upper member 82 may also function as an additional baffle plate 92.

As shown in FIGS. 5 and 6, the cross-sectional area of the drainage channel 76 is larger than the cross-sectional area of the opening 70*a* to 70*c* of the drainage port 68. The opening 70*a* to 70*c* of the drainage port 68 defines a narrow portion. When there are several openings (e.g., openings 70*a* to 70*c*), it is preferable to have the cross-sectional area of the discharge channel 76 be larger than the total cross-sectional area of the openings. The air, which is drawn into the canister 28 through the dust filter 40 or discharged from the canister 28, may pass through the drainage port 68. Therefore, it is possible to suppress a decrease in ventilation resistance due to the cover 74, for instance, by designing the cross-sectional area of the drainage port 68 as described above.

As shown in FIG. 6, the baffle plates 88*a*, 88*b*, and 88*c* are oriented at slopes 94*a*, 94*b*, and 94*c*, respectively, on the side of the drainage port 68, thereby forming ramps. The slopes 94*a*, 94*b*, and 94*c* may be surfaces such that a line of intersection with the bottom surface of the case 48 is inclined to either side with respect to the horizontal. By forming ramps with the slopes 94*a*, 94*b*, and 94*c*, the baffle plates 88*a*, 88*b*, and 88*c* may further suppress the infiltration of water into the case 48 via the outlet 78. The slopes 94*a*, 94*b*, and 94*c* may also allow the water from the drainage port 68 to more smoothly flow downward inside the cover 74.

As shown in FIGS. 2 and 3, the cover 74 may be a member separate from the case 48, and that is attached to the case 48 by an appropriate attachment mechanism. In this embodiment, the case 48 and the cover 74 are each be provided with one or more integrally molded engaging portion (attaching portion(s)) 96, 98. Therefore, the engaging portion 98 of the cover 74 engages with the engaging portion 96 of the case 48. For example, in one embodiment of the cover 74 having a two-member configuration, the lower member 80 is provided with the engaging portion 98, and the upper member 82 is attached to the lower member 80 by a snap-fit mechanism.

As shown in FIGS. 3, 5, and 8 to 10, in this embodiment, the cover 74 is slid relative to the case 48 to attach the cover 74 to the case 48. In order to facilitate the relative movement, the cover 74 and the case 48 are provided with a guide mechanism to guide the relative movement (e.g., a slide movement). For example, the engaging portion 96 of the case 48 is provided with a pair of grooves 100. The pair of grooves 100 extend in parallel with each other and open in opposite directions. In addition, the engaging portion 98 of the cover 74 includes a pair of projecting pieces 102. The pair of projecting pieces 102 are configured to fit into the grooves 100. As shown in FIG. 4, for example, the pair of grooves 100 are opened in the direction away from each other. If this is the case, the projecting pieces 102 are projected in the direction facing each other. The projecting pieces 102 project from a pair of supporting portions 104. The pair of supporting portions 104 extend, in the sliding direction, from a base portion 116 of the engaging portion 98. Although not shown, in another embodiment, the pair of grooves 100 may be opened so as to face each other. In yet another embodiment, the cover 74 may be provided with a groove, and the case 48 may be provided with a projecting piece. The movement of the cover 74 is guided when it slides in the direction of the groove 100. This sliding occurs when each projecting piece 102 is fit into the corresponding groove 100.

Figure 9:
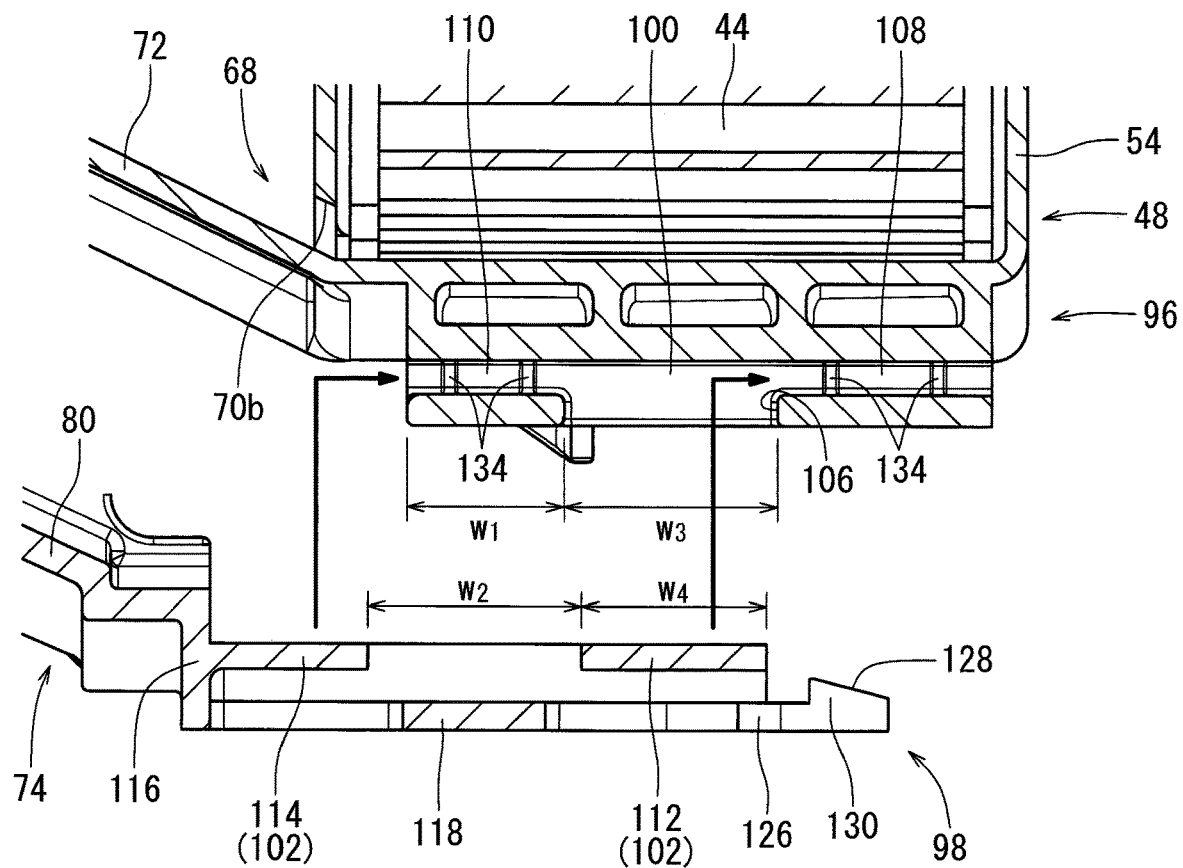
FIG. 9 is an enlarged cross-sectional view of the dust filter of FIG. 2 before attaching the cover to the case.

Each groove 100 may be divided into a front portion 108 and a rear portion 110 in the inserting direction. The front and rear portions 108, 110 are separated by a notch 106 on the outer side wall of the groove 100. Each projecting piece 102 may be divided into a front portion 112 and a rear portion 114 in the inserting direction. The front portion 112 of the projecting piece 102 is inserted into the groove 100 through the notch 106. Upon insertion, the cover 74 may be slid. Then, the front portion 112 and the rear portion 114 of the projecting piece 102 are fit into the front portion 108 and the rear portion 110 of the groove 100, respectively. Since the front portion 112 of the projecting piece 102 may enter the middle of the groove 100, rather than from the end, the distance of sliding of the cover 74 required for attachment may be reduced. As a result, it is possible to prevent the cover 74 from interfering with surrounding members (for example, the inlet pipe 24). As shown in FIG. 9, width W1 refers to the width of the side wall of the rear portion 110 of the groove 100, distance W2 refers to the distance between the front portion 112 and the rear portion 114 of the projecting piece 102, width W3 refers to the width of the notch 106 of the groove 100, and width W4 refers to the width of the front portion 112 of the projecting piece 102. The clearance between distance W2 and width W1 may be made larger than the clearance between width W3 and width W4 (i.e., (W2−W1)>(W3−W4)). Therefore, if the front portion 112 of the projecting piece 102 is inserted into the notch 106 of the groove 100, an operator does not have to worry too much about whether the side wall of the rear portion 110 of the groove 100 will be properly inserted. In some embodiments, a flexible piece may be connected, via a connecting portion 118, to both the base portion 116 of the engaging portion and to the supporting portion 104, which extends from the base portion 116. With such a configuration, it may be difficult to see the side wall of the rear portion 110 of the groove 100, at least in part due to the connecting portion 118. In such cases, the clearance design described above is effective.

As shown in FIGS. 3, 5, 8, and 9, by providing an elastic flexible piece in the engaging portion of the case 48 or the cover 74, it is possible to engage the other engaging portion by using the elastic deformation of the flexible piece. For example, in this embodiment, a pawl 124 having a slope 122 is provided on the outer surface of the case 48. A flexible piece 120 extending, for instance in a cantilevered fashion, from the base portion 116 is provided at the attaching portion. The flexible piece 120 may be formed, for example, in U-shape. The flexible piece 120 has a rear-facing edge against the insertion direction configured to abut the pawl 124. As the cover 74 is slid, the flexible piece 120 may travel up the slope 122 while being bent and then ride on the pawl 124. When the cover 74 reaches a predetermined position, the bending of the flexible piece 120 is restored. Accordingly, the rear-facing edge of the flexible piece 120 may engage the pawl 124, thereby completing the attachment of the cover 74.

Another pawl may be provided at the engaging portion of the cover 74. For example, in this embodiment, a flexible piece 126 extending, for example in a cantilever fashion, from the base portion 116 may be provided on the attaching portion. A pawl 130 having a slope 128 is provided on the flexible piece 126. As the cover 74 is slid, the slope 128 of the pawl 130 strikes the projecting portion 132 of the case 48. As a result, the flexible piece 126 is bent and the pawl 130 rides on the projecting portion 132 of the case 48. When the cover 74 comes to the predetermined position, the pawl 130 engages the projecting portion 132 of the case 48. The timing at which the two pawls 124, 130 engage their respective targets may be designed to occur at the same time. The pawls 124, 130 prevent the cover 74 from rattling in the sliding direction when the cover 74 is attached.

The pawls and flexible pieces described above may also be structured to prevent the cover 74 from being assembled in the wrong way. For example, if the front portion 112 of the projecting piece 102 is mistakenly inserted from the rear end of the rear portion 110 of the groove 100, the pawl 130 on the cover side strikes the pawl 124 on the case 48 side. Therefore, the cover 74 is prevented from being inserted at all or would only allow it to be inserted a little.

Figure 10:
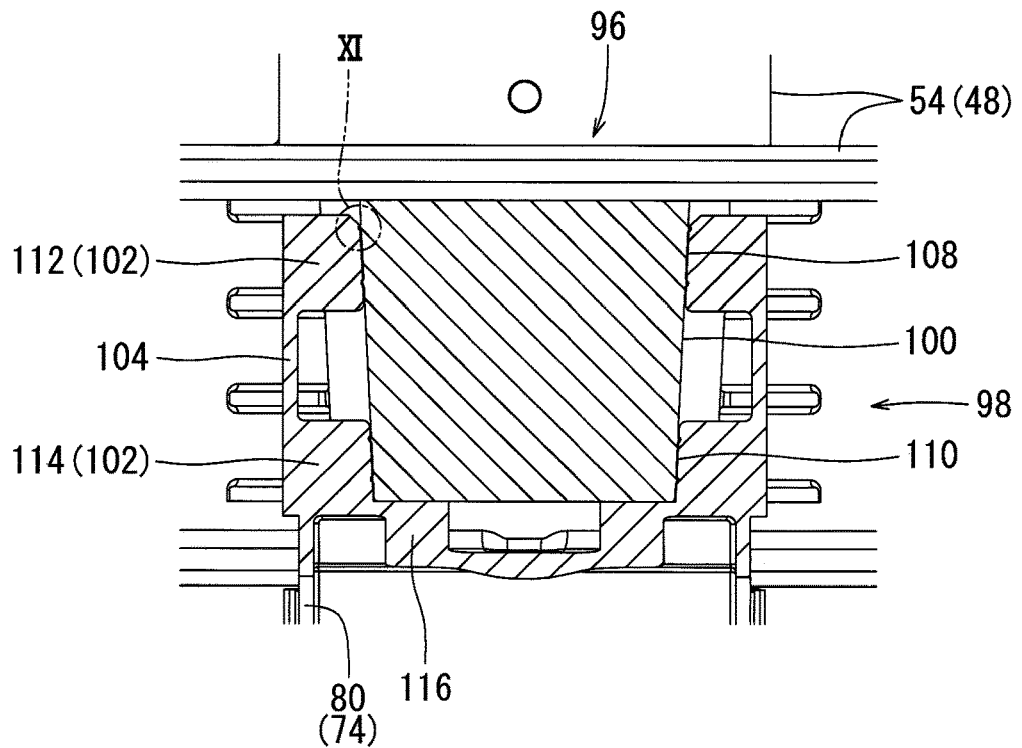
FIG. 10 is a cross-sectional view of the engaging portion between the case and the cover of FIG. 3 taken along the projecting piece.
Figure 11:
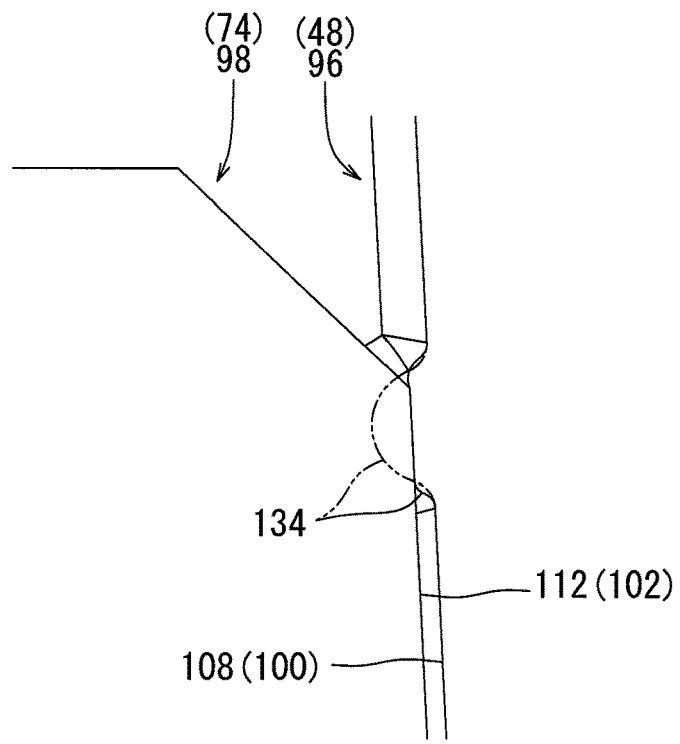
FIG. 11 is an enlarged view of the protrusion provided at the bottom of a groove of FIG. 10 taken in the circle XI of FIG. 10.

As shown in FIGS. 9 to 11, a protrusion 134 is provided at the bottom surface of each groove 100. The protrusions 134 is configured to prevent the cover 74 from rattling in a direction orthogonal to the slide direction when the cover 74 is in the attached state (in the depth direction of the groove). When the cover 74 is slid and the pawls are engaged (attachment is completed), the tip of the projecting piece 102 presses the protrusions 134. Therefore, the rattling in the direction orthogonal to the slide direction is elastically absorbed. The bottom surfaces of the pair of grooves 100 are inclined so as to be gradually separated from each other toward the inserting direction. Correspondingly, the tip surface of the pair of projecting pieces 102 facing the bottom surface of the groove 100 are also inclined so as to be gradually separated from each other toward the inserting direction. As a result, during the stage of inserting the projecting pieces 102 into the grooves 100, a clearance with the groove 100 is provided, and during the stage of sliding to complete the attachment, the protrusion 134 at the bottom surface of the groove 100 are effective to bridge the clearance.

In the embodiment of FIG. 2 described above, the cover 74 is formed separately from the case 48. However, in another embodiment shown in FIGS. 12 and 13, a part of a cover 274 may be integrally molded with a case 248. For example, the cover 274 may be divided into an upper member 282 and a lower member 280. The upper member 282 of the cover 274 is integrally formed with a lower member 254 of the case 248. However, from another point of view, in both the embodiments of FIGS. 2 and 12, it can be said that a second portion is formed separately from a first portion, the first portion including the filtration member and the case. It can also be said that the second portion is attached to the first portion by an engaging portion. Thereby, the cover of the dust filter may cover a drainage port. Therefore, the second portion may include all or part of the cover.

Figure 12:
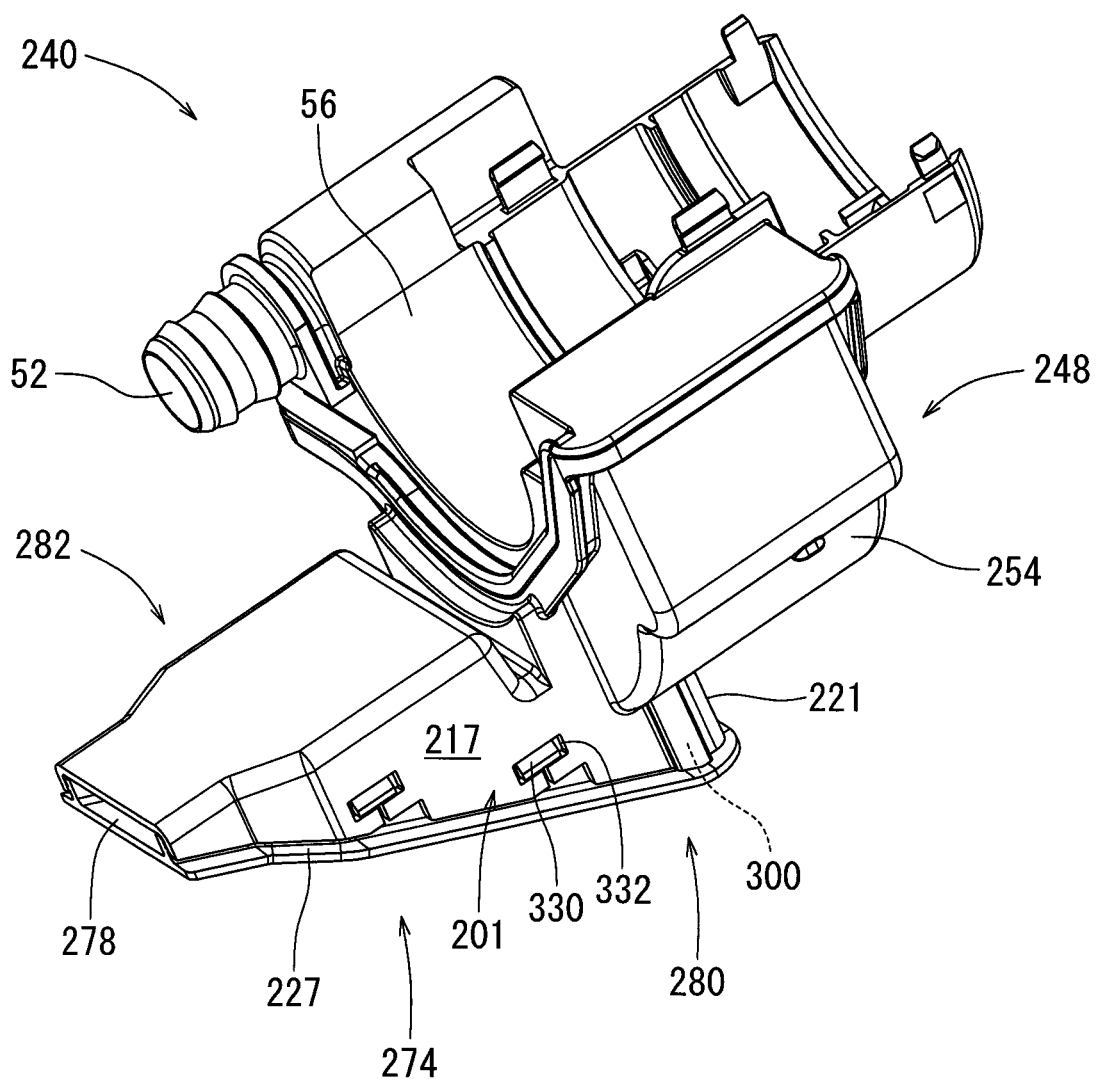
FIG. 12 a perspective view of another embodiment of a dust filter in accordance with the principles described herein.
Figure 13:
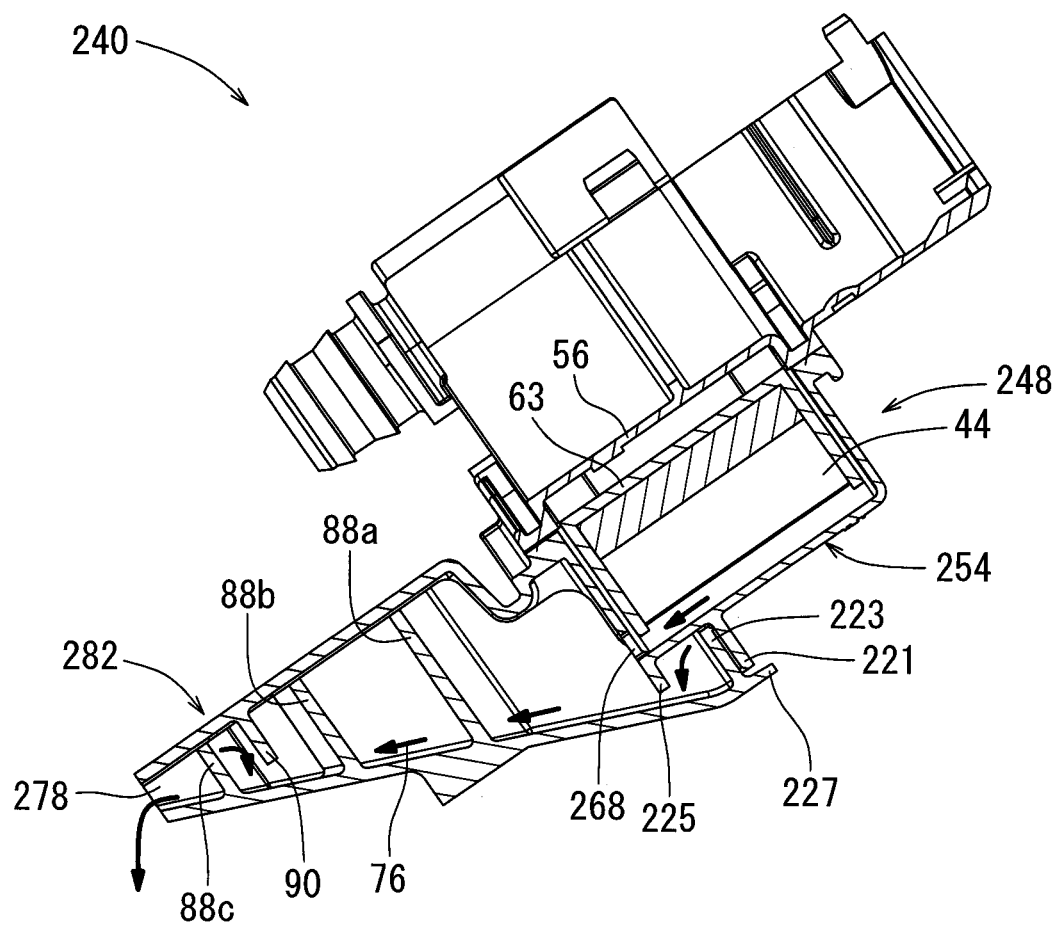
FIG. 13 a cross-sectional view of the dust filter of FIG. 12

As shown in the embodiment of FIGS. 12 and 13, the cover 274 is formed by the upper member 282 and the lower member 280. In this embodiment, the cover 274 is a hollow member having the drainage channel 76 formed therein. The cover 274 has an outlet 278 that opens to the outside. The outlet 278 is positioned lower than the drainage port 268, for instance lower relative to the direction of gravity. Water, which has infiltrated the case 248, may be discharged to the cover 274 via the drainage port 268. Then, the water may be discharged from the outlet 278 to the outside, after having traveled through the drainage channel 76. The lower member 280 of the cover 274 is provided with baffle plates 88a, 88b, 88c, which may be similar to those previously described with reference to FIGS. 5 and 6.

Referring still to FIGS. 12 and 13, in this embodiment, the upper member 282 opens downwardly and the lower member 280 opens upwardly. The outlet 278 of the cover 274 is formed by both the upper member 282 and the lower member 280. The upper member 282 is formed so as to surround the drainage port 268. As described above, the upper member 282 of the cover 274 is integrally molded with the lower member 254 of the case 248. Therefore, the drainage port 268 penetrates a portion of the integral member. It can also be said that the drainage port 268 opens toward the inside of the upper member 282. The upper member 282 of the cover 274 is integrally molded with a part of the case 248. Therefore, for example, it is possible to prevent water, which may be flowing along the lower surface of the inclined inlet pipe 24 (see FIG. 2), from entering the cover 274 through the upper side of the cover 274. Preferably, even when the inside of the case 248 is subjected to negative pressure, the drainage port 268 is positioned so as to not suck up water that have entered the inside of the cover 274. This may be accomplished, for instance, by positioning the drainage port 268 as far upward as possible from the bottom surface of the lower member 280.

Figure 14:
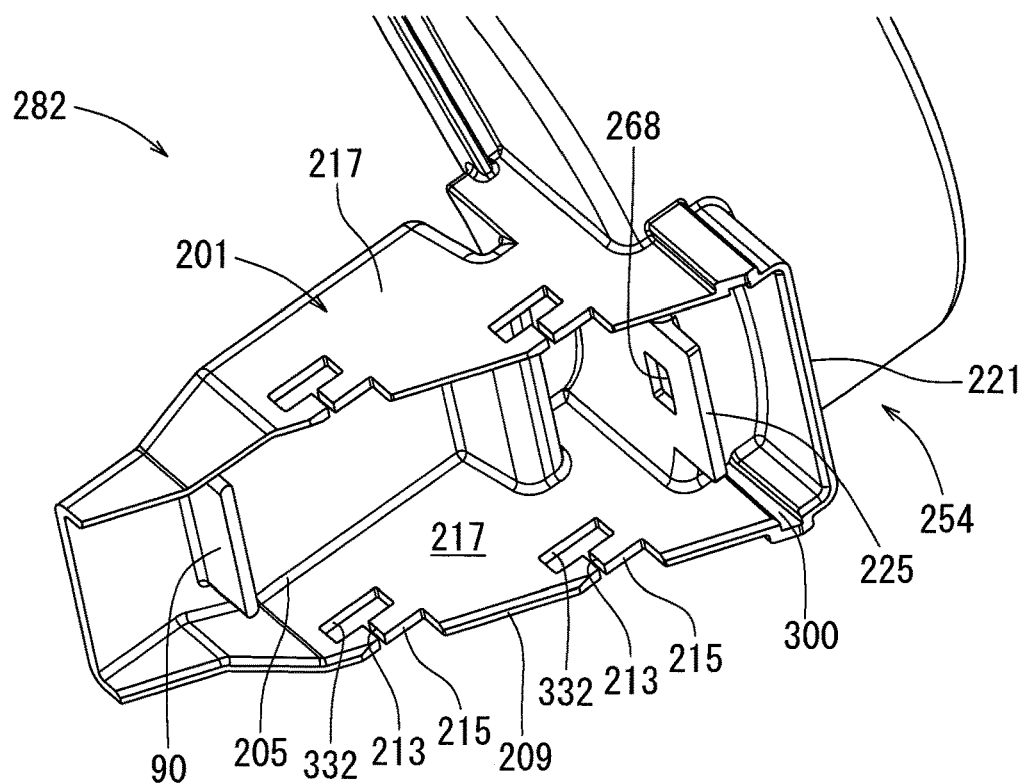
FIG. 14 is a perspective view of the upper member of the cover of the dust filter of FIG. 12 as viewed from under the upper member.
Figure 15:
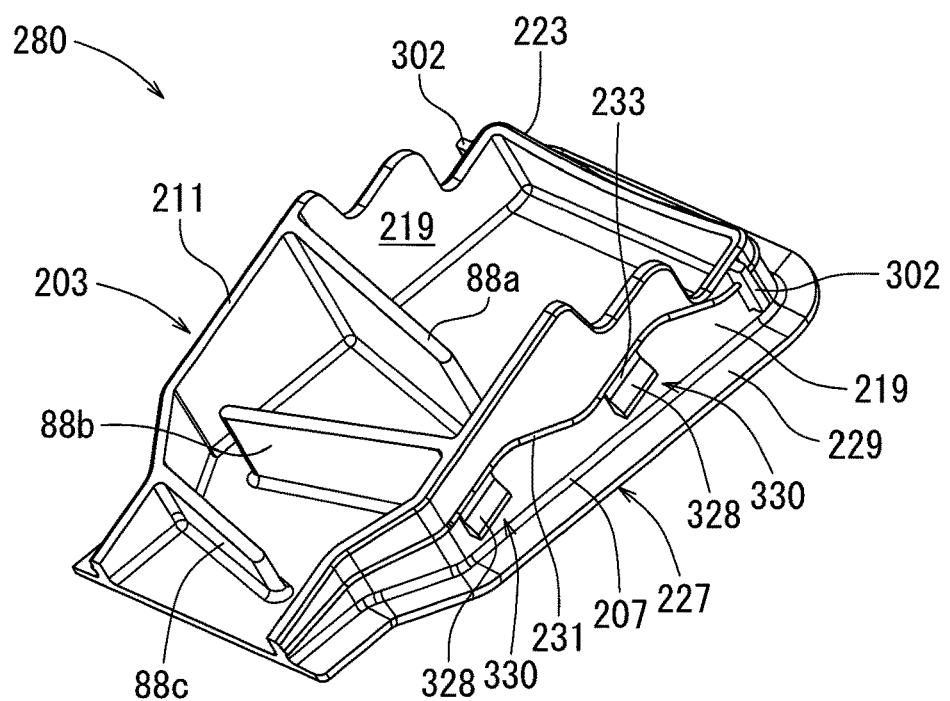
FIG. 15 a perspective view of the lower member of the cover of the dust filter of FIG. 12.

As shown in FIGS. 14 and 15, the upper member 282 and the lower member 280 of the cover 274 each include a wall 201, 203. The lower member 280 is fit inside the upper member 282 so that the wall 201 of the upper member 282 overlaps the wall 203 of the lower member 280. The wall 201 of the upper member 282 extends to the vicinity of a lower end edge 207 of the wall 203 of the lower member 280. Further, the wall 203 of the lower member 280 extends, in some embodiments as close as possible, to the vicinity of an upper end edge 205 of the wall 201 of the upper member 282. As a result, water, which has entered from below into the gaps between the overlapping walls 201, 203, may be prevented or delayed from entering the cover 274. In another embodiment (not shown), depending on the arrangement and shape of the baffle plate(s), the lower member 280 may be designed to fit outside the upper member 282.

Figure 16:
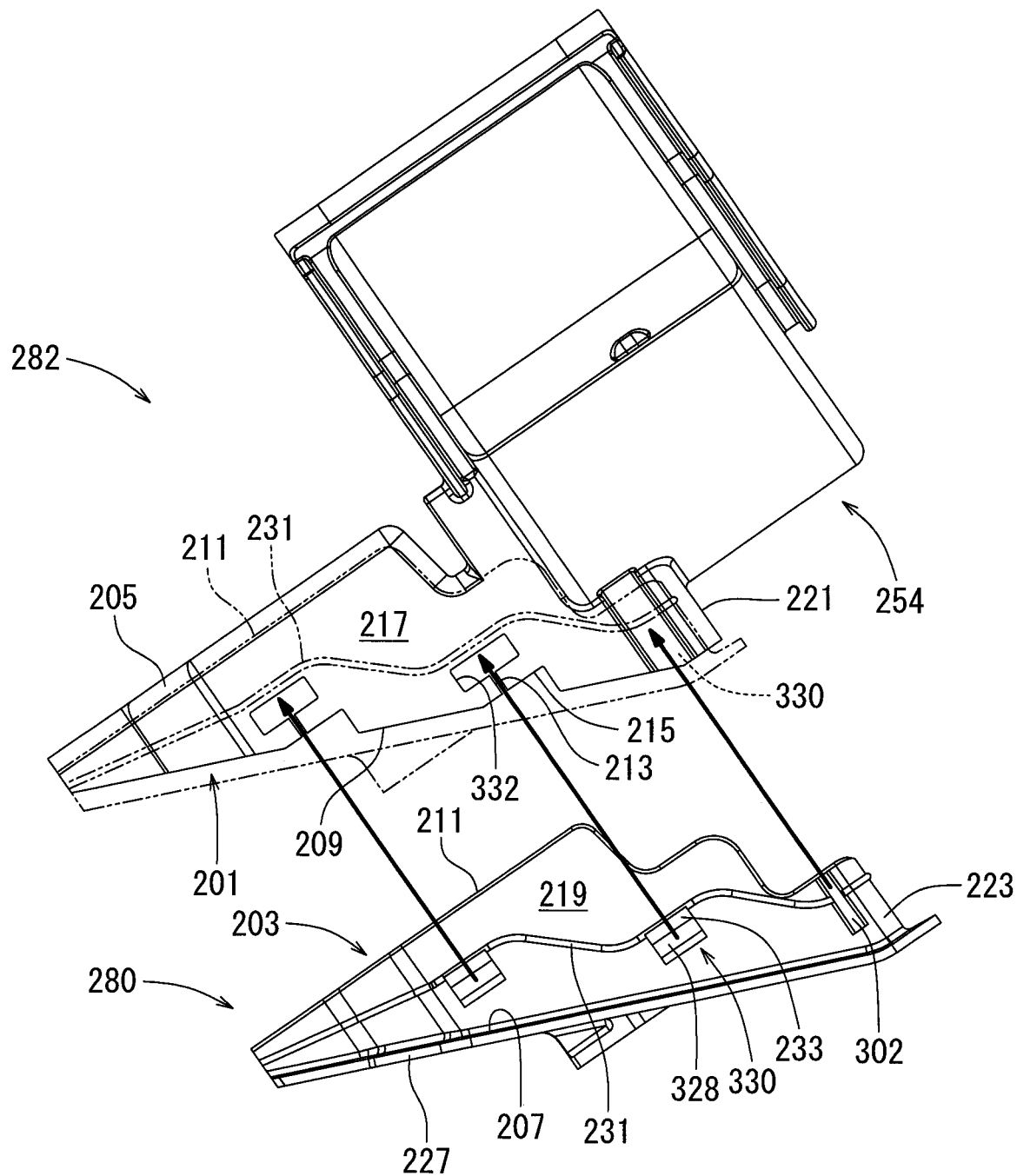
FIG. 16 is a side view at the time of attaching the lower member of FIG. 15 to the upper member of FIG. 14.

As shown in FIGS. 14 to 16, each of the upper member 282 and the lower member 280 of the cover 274 include an integral engaging portion for assembly. For example, in this embodiment, the engaging portion of the upper member 282 comprises at least one locking hole 332 formed in wall 201, and the engaging portion of the lower member 280 comprises a pawl 330 formed on wall 203. The pawl 330 is configured to engage the locking hole 332. In the illustrated embodiment, two locking holes 332 are provided in each side wall 217 of the wall 201 of the upper member 282 and two pawls 330 are provided on each side wall 219 of the wall 203 of the lower member 280. When the lower member 280 is slid and moved, a slope 328 of the pawl 330 strikes a lower end edge 209 of the wall 201 of the upper member 282. This causes the wall 201 of the upper member 282 to bend outward, thereby allowing the pawl 330 to slip inside the wall 201. When the lower member 280 reaches the predetermined position, the bending of the wall 201 returns and the pawl 330 engages the edge of the locking hole 332, thereby completing attachment of the lower member 280. The pawl 330 is easily inserted into the locking hole 332 by providing a slit 213 between the locking hole 332 and the lower end edge 209 of the wall 201. The wall 201 of the upper member 282 is more easily bent by the pawl 330 by virtue of providing the locking hole 332 as close to the lower end edge 209 of the wall 201 as practical. For that purpose, various pawls 330 may be disposed at different distances from the upper surface of the upper member 282, for instance in a step-like fashion. Further, if the direction of the pawl 330 is oblique to the lower end edge 209 of the wall 201, a notch 215 may be provided at the lower end edge 209 of the wall 201, for instance as shown in FIG. 16. As a result, the slope 328 of the pawl 330 may instead be brought into line contact with the lower end edge 209 of the wall 201 at the time of attachment.

As shown in FIGS. 14 to 16, in this embodiment, the lower member 280 of the cover 274 is slidably attached by moving relative to the upper member 282. For that purpose, the cover 274 includes a guide mechanism configured to guide the relative movement (e.g., a sliding movement) of the lower member 280. For example, the upper member 282 includes a groove 300, and the lower member 280 includes a protruding portion 302. The protruding portion 302 has a linear shape and is fit into the groove 300. The groove 300 is provided, for example, on the inner side surface of the side wall 217 of the wall 201 of the upper member 282 as shown in FIG. 14. In this case, the protruding portion 302 is provided on the outer surface of the corresponding side wall 219 of the wall 203 of the lower member 280 as shown in FIG. 15. The movement of the lower member 280 is guided by sliding the lower member 280 in the direction of the groove 300 while fitting each protruding portion 302 in the corresponding groove 300. Although not shown, in another embodiment, the lower member 280 may be provided with a groove, and the upper member 282 may be provided with a linear protrusion. In yet another embodiment, it is possible to guide the movement of the lower member 280 of the cover 274 by providing a groove or a linear protrusion on the outer surface of the lower member 254 of the case 248.

As shown in FIGS. 15 and 16, a linear protrusion 231 is formed on the wall 203 of the lower member 280 of the cover 274. The linear protrusion 231 projects toward the wall 201 of the upper member 282 of the cover 274. In one embodiment, the linear protrusion 231 extends continuously over the entire wall 203, that is, along the side walls 219 on both sides and a rear wall 223 of the lower member 280. As a result, water, which may have entered the gaps between the overlapping walls 201, 203 from below, may be prevented or delayed from enter the cover 274. The linear protrusion 231 is arranged at any desirable position within the overlapping range of the two walls 201, 203. However, for example, the linear protrusion 231 may be disposed above the opening of the engaging portion when the lower member 280 is attached to the upper member 282. Therefore, it may be possible to prevent water from entering the cover 274 if the water has entered through the opening of the engaging portion. Further, the pawl 330 of the engaging portion is provided with a base portion 233 having the same height as the linear protrusion 231. A part of the linear protrusion 231 may be integrally formed with the base portion 233. As a result, the infiltration of water may be suppressed by the base portion 233 of the pawl 330 as well.

Figure 17:
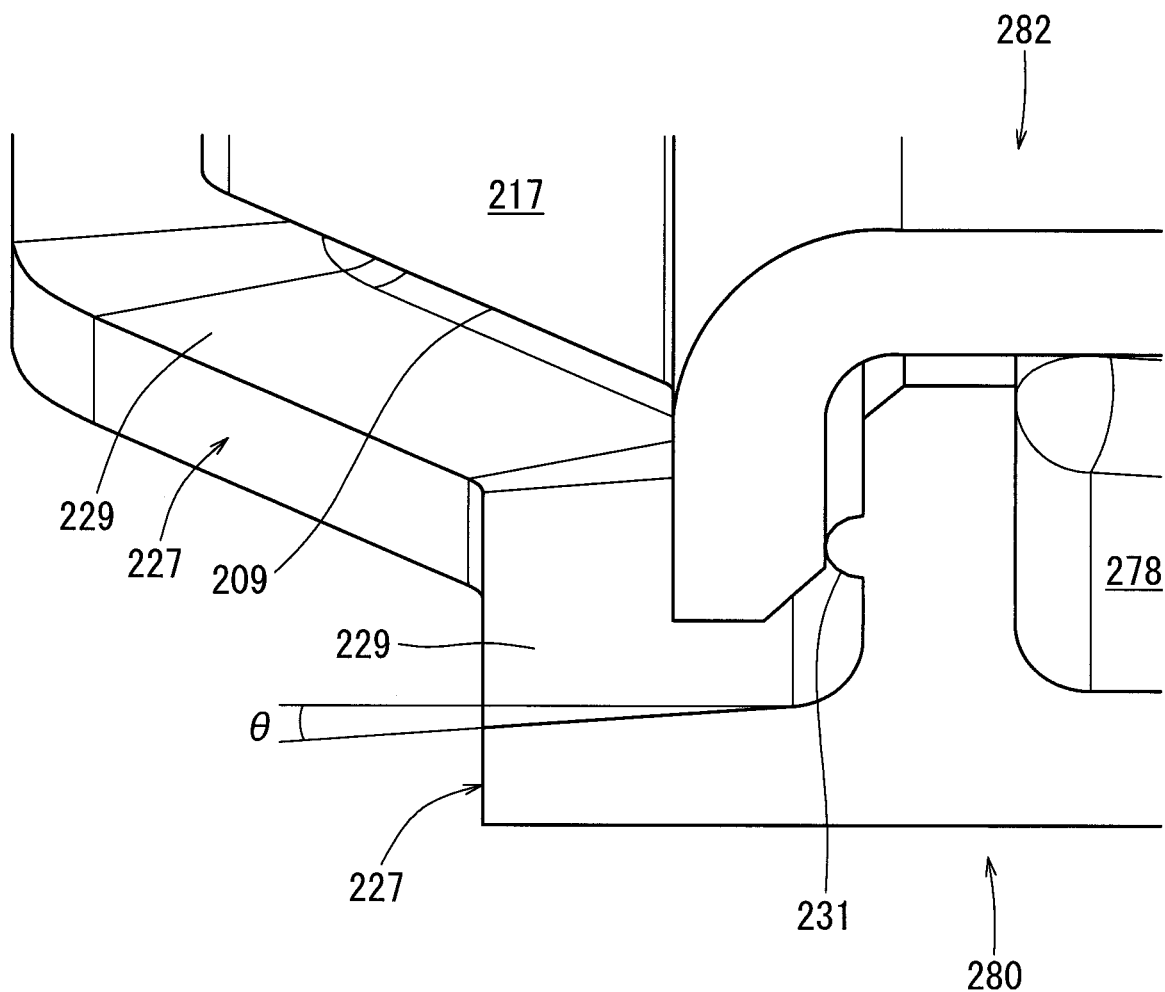
FIG. 17 is an enlarged view of the inclined upper surface of the flange disposed on the lower member of FIG. 15.

As shown in FIGS. 12 and 15, the wall 203 of the lower member 280 of the cover 274 includes a flange 227. The flange 227 covers the area extending below the gap between the two overlapping walls 201, 203. For example, the flange 227 extends continuously along the lower end edge of the wall of the lower member 280 over its entire wall 203 (side walls 219 on both sides and the rear wall 223). As a result, it is possible to prevent a vigorous flow of water from directly infiltrating the gap between the two overlapping walls 201, 203. As shown in FIG. 17, an upper surface 229 of the flange 227 is tilted downward (for instance by an angle θ) toward the edge of the flange 227. Therefore, water traveling along the outer surface of the wall 201 of the upper member 282 may be prompted to fall from the cover 274. The flange 227 shown in FIGS. 12 and 15 becomes thinner toward the edge so as to form an inclination on the upper surface 229. However, in another embodiment (not shown), the upper surface may be inclined by inclining the flange 227 itself, even though the thickness of the flange 227 is kept constant. In yet another embodiment, a second flange parallel to the first flange 227 may be provided on the lower end edge 209 of the wall 201 of the upper member 282.

As shown in FIG. 13, the upper member 282 of the cover 274 includes a projecting portion or a baffle plate extending downward between the drainage port 268 and the wall 201 of the upper member 282. For example, a downwardly extending projecting portion 225 is provided between the drainage port 268 and a rear wall 221 of the wall 201 of the upper member 282. Accordingly, it is possible to prevent water, which may have infiltrated the inside of the rear wall 221 of the upper member 282 by entering through the ceiling surface of the upper member 282, from reaching the immediate vicinity of the drainage port 268. As a result, the water may be directed toward the floor of the lower member 280. Further, a baffle plate 90 is provided between the drainage port 268 and the outlet 278 of the cover 274. Accordingly, it is possible to prevent water, which may have entered through the outlet 278 of the cover 274, from infiltrating deep inside the cover 274 and over the baffle plate 88c.

The various examples described above in detail with reference to the attached drawings are intended to be representative of the present disclosure and are thus non-limiting embodiments. The detailed description is intended to teach a person of skill in the art to make, use, and/or practice various aspects of the present teachings, and thus does not limit the scope of the disclosure in any manner. Furthermore, each of the additional features and teachings disclosed above may be applied and/or used separately or with other features and teachings in any combination thereof, to provide an improved dust filter, and/or methods of making and using the same.

What is claimed is:

1. A dust filter configured to filter air drawn into a vehicle canister, the dust filter comprising:
a first portion; and
a second portion coupled to the first portion, wherein:
the first portion includes a first engaging portion;
the second portion includes a second engaging portion;
the second portion is attached to the first portion by engaging the second engaging portion of the second portion with the first engaging portion of the first portion;
the first portion includes a case having an inner chamber and a filtration member disposed in the inner chamber;
the case includes a drainage port configured to drain liquid within the inner chamber;
the second portion is attached to the first portion to form a cover, wherein the cover covers the drainage port together with the first portion; and
the cover has an outlet that opens to the outside, wherein the outlet is disposed at a position lower than the drainage port.

2. The dust filter of claim 1, wherein:
the first portion comprises a cover upper member including the first engaging portion integrally formed therewith;
the cover upper member is integrally molded with at least a part of the case;
the cover upper member surrounds the drainage port;
the second portion comprises a cover lower member having the second engaging portion integrally formed therewith; and
the cover is defined by the cover lower member and the cover upper member.

3. The dust filter of claim 2, wherein:
the cover upper member includes a wall and the cover lower member includes a wall;
the cover lower member is fitted inside the cover upper member so that the wall of the cover upper member overlaps the wall of the cover lower member; and
the wall of the cover upper member extends toward a lower end of the wall of the cover lower member.

4. The dust filter of claim 3, wherein the wall of the cover lower member includes a linear protrusion that projects toward the wall of the cover upper member.

5. The dust filter of claim 4, wherein:
the first engaging portion includes a locking hole;
the second engaging portion includes a pawl configured to engage the locking hole; and
the linear protrusion is disposed above the locking hole when the second portion is attached to the first portion.

6. The dust filter of claim 3, wherein:
a flange is formed on the wall of the cover lower member; and
the flange is configured to cover in the extending direction a gap between the overlapped walls of the cover upper member and the cover lower member.

7. The dust filter of claim 6, wherein the flange includes an upper surface that slopes downward toward an edge thereof.

8. The dust filter of claim 3, wherein:
the cover upper member includes a baffle plate or a projecting portion that extends downward;
the baffle plate or the projecting portion is positioned between the drainage port and the wall of the cover upper member or between the drainage port and the outlet.

9. The dust filter of claim 1, wherein:
the second portion includes a cover first member and a cover second member;
the cover first member includes the second engaging portion integrally formed therewith;
the cover second member is attached to the first cover member by a snap-fit mechanism; and
the cover is formed by attaching the cover second member to the cover first member.

10. The dust filter of claim 1, wherein:
one of the first engaging portion and the second engaging portion includes a pair of grooves that extend in parallel to each other and open in opposite directions;
the other of the first engaging portion and the second engaging portion includes a projecting piece corresponding to each of the grooves; and
the cover is configured to be attached to the case by moving the projecting pieces along the grooves with the projecting pieces fit into the grooves.

11. The dust filter of claim 10, wherein:
each groove has a protrusion at a bottom thereof; and
the projecting pieces are configured to press the protrusions when the cover is attached to the case.

12. The dust filter of claim 10, wherein:
each groove has a notch on the corresponding side wall;
each projecting piece is divided into a front portion and a rear portion; and
the front portion of each projecting piece is inserted into the corresponding groove through the corresponding notch.

13. The dust filter of claim 1, wherein:
one of the first engaging portion and the second engaging portion is elastically deformable; and
the other of the first engaging portion and the second engaging portion is configured to be engaged by the elastic deformation.

14. The dust filter of claim 1, wherein:
the second portion is configured to be attached to the first portion by moving relative to the first portion; and
a guide mechanism configured to guide the relative movement is provided between the first portion and the second portion.

15. The dust filter of claim 1, wherein:
the drainage port is at least one opening formed at the bottom of the inner chamber;
at least one baffle plate is positioned inside the cover; and
a drainage channel defined by the baffle plate that does not permit direct linear fluid communication between the opening and the outlet.

* * * * *